US012682275B2

(12) United States Patent
Tomoda

(10) Patent No.: US 12,682,275 B2
(45) Date of Patent: Jul. 14, 2026

(54) LEARNING MODEL APPLYING SYSTEM, A LEARNING MODEL APPLYING METHOD, AND A PROGRAM

(71) Applicant: RAKUTEN GROUP, INC., Tokyo (JP)

(72) Inventor: Kyosuke Tomoda, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 842 days.

(21) Appl. No.: 17/415,742

(22) PCT Filed: Sep. 9, 2019

(86) PCT No.: PCT/JP2019/035376
§ 371 (c)(1),
(2) Date: Jun. 18, 2021

(87) PCT Pub. No.: WO2021/048902
PCT Pub. Date: Mar. 18, 2021

(65) Prior Publication Data
US 2022/0083910 A1 Mar. 17, 2022

(51) Int. Cl.
*G06N 20/00* (2019.01)
*G06F 18/211* (2023.01)
*G06F 21/12* (2013.01)

(52) U.S. Cl.
CPC ........... *G06N 20/00* (2019.01); *G06F 18/211* (2023.01); *G06F 21/128* (2013.01)

(58) Field of Classification Search
CPC ...... G06F 18/211; G06F 21/128; G06N 20/00
See application file for complete search history.

(56) References Cited

U.S. PATENT DOCUMENTS

| | | | |
|---|---|---|---|
| 2015/0213376 A1 | 7/2015 | Deses et al. | |
| 2016/0065603 A1* | 3/2016 | Dekel ................ H04L 63/1425 726/23 |
| 2018/0060738 A1 | 3/2018 | Achin et al. | |
| 2020/0272849 A1 | 8/2020 | Tomoda | |

FOREIGN PATENT DOCUMENTS

| | | |
|---|---|---|
| CN | 109993340 A | 7/2019 |
| JP | 2011191252 A | 9/2011 |
| JP | 2013090752 A | 5/2013 |
| JP | 2015041317 A | 3/2015 |

(Continued)

OTHER PUBLICATIONS

JP-2019102960-A Translation (Year: 2019).*

(Continued)

*Primary Examiner* — Schyler S Sanks
(74) *Attorney, Agent, or Firm* — HEA Law PLLC

(57) ABSTRACT

A learning model applying system including at least one processor configured to: calculate a plurality of feature amounts based on data for training used for training a learning model; select at least one of the plurality of feature amounts based on an impact of each feature amount on the learning model; apply a trained learning model that is trained based on the selected feature amount, and perform a setting related to calculation of a feature amount to be entered in the trained learning model based an the selected feature amount.

18 Claims, 10 Drawing Sheets

(56) References Cited

FOREIGN PATENT DOCUMENTS

| | | | |
|---|---|---|---|
| JP | 2018169994 A | | 11/2018 |
| JP | 2019005512 A | | 1/2019 |
| JP | 2019036865 A | | 3/2019 |
| JP | 2019102960 A | * | 6/2019 |
| WO | 2019049210 A1 | | 3/2019 |

OTHER PUBLICATIONS

Hirota, K., Hachisu, S., Arai, Y. (1988). Fuzzy Robot Vision and Fuzzy Controlled Robot. In: Turksen, I.B., Asai, K., Ulusoy, G. (eds) Computer Integrated Manufacturing. NATO ASI Series, vol. 49. Springer, Berlin, Heidelberg. https://doi.org/10.1007/978-3-642-83590-2_11 (Year: 1988).*

Sadeghzadeh et al. ("Variable Selection Methods for Right-Censored Time-to-Event Data with High-Dimensional Covariates", Journal of Quality and Reliability Engineering, vol. 2015, Article ID 795154, 9 pages, 2015. https://doi.org/10.1155/2015/795154) (Year: 2015).*

Khammassi, Chaouki, and Saoussen Krichen. "A GA-LR wrapper approach for feature selection in network intrusion detection." computers & security 70 (2017): 255-277. (Year: 2017).*

Altmann A, ToloÅi L, Sander O, Lengauer T. Permutation importance: a corrected feature importance measure. Bioinformatics. May 15, 2010;26(10):1340-7. doi: 10.1093/bioinformatics/btq134. Epub Apr. 12, 2010. (Year: 2010).*

KDDCup1999data. The UCI KDDArchive, Information and Computer Science. Irvine, CA: University of California; 1999. Available from: http://kdd.ics.uci.edu/databases/kddcup99/ kddcup99.html. (Year: 1999).*

International Search Report for PCT/JP2019/035376 with English translation pp. 1-4.

Dec. 15, 1988, vol. 6, No. 6, pp. 89-94, ISSN 0289-1824, Hirota, Kaoru, "Fuzzy robot vision", Journal of the Robotics Society of Japan (See English translation of the International Search Report for PCT/JP2019/035376, and Partial Translation of the Office Action and the Decision of Refusal.).

Sep. 2012, vol. 16, No. 5, pp. 399-407, ISSN 1342-6230, Sumiya, Mari, Hamada, Nozomu, "Rotation-Robust Shape Detection Using Local Self-Similarities", Journal of Signal Processing (English translation of the International Search Report for PCT/JP2019/ 035376, and Partial Translation of the Office Action and the Decision of Refusal.).

Tadao Yamada et al., [Shinmeikaikokugojiten] 7th edition, 5th printing, Kabushikikaisha Sanseido, Jan. 10, 2016, pp. 159, 439 (See Partial Translation of the Decision of Refusal.).

Minoru Nishio, et al., [Iwanamikokugojiten] 7th new edition, 4th printing, Kabushikikaisha Iwanamishoten Jan. 15, 2015, pp. 426, 588 (See Partial Translation of the Decision of Refusal.).

Office Action of Sep. 9, 2020 for corresponding JP Application No. 2020-539117 with partial translations pp. 1-10.

Office Action of Dec. 1, 2020 for corresponding JP Application No. 2020-539117 with partial translations pp. 1-12.

Office Action of Sep. 7, 2021, for corresponding JP Patent Application No. 2020-539117 with partial English translation pp. 1-3.

Search Report of Dec. 6, 2021, for corresponding EP Patent Application No. 19944677.4 pp. 1-12.

Office Action of Jul. 7, 2025, for corresponding EP Patent Application No. 19944677.4, pp. 1-10.

* cited by examiner

| No | USER ID | USER NAME | IP ADDRESS | BEHAVIOR DATA | | | | | | | |
| | | | | URL | ACCESS LOCATION | ACCESS DATE/TIME | PAYMENT AMOUNT | PAYMENT DATE/TIME | ... | FRAUD FLAG |
|---|---|---|---|---|---|---|---|---|---|---|
| 1 | u00001 | USER A | 192.168.39.32 | URL1 | MINATO-KU···, TOKYO | 2019/3/26 10:25:45 | 50000 | 2019/3/26 10:29:04 | ... | 1 |
| 2 | u00002 | USER B | 192.174.25.56 | URL2 | YOKOHAMA-SHI···, KANAGAWA | 2019/3/26 10:26:14 | 4000 | 2019/3/26 10:31:42 | ... | 0 |
| 3 | u00003 | USER C | 192.175.116.25 | URL3 | KITAKYUSHU-SHI···, FUKUOKA | 2019/3/26 10:26:22 | 3500 | 2019/3/26 10:36:24 | ... | 0 |
| · | · | · | · | · | · | · | · | · | · | · |

| No | FEATURE AMOUNT | | | | | | UNAUTHORIZED USER |
| | FEATURE AMOUNT 1 | FEATURE AMOUNT 2 | FEATURE AMOUNT 3 | FEATURE AMOUNT 3 | ... | FEATURE AMOUNT n | |
| --- | --- | --- | --- | --- | --- | --- | --- |
| 1 | 1 | 4 | 10 | 6 | ... | 0 | 1 |
| 2 | 0 | 2 | 5 | 2 | ... | 1 | 0 |
| 3 | 0 | 5 | 1 | 0 | ... | 1 | 0 |
| . . . | . . . | . . . | . . . | . . . | . . . | . . . | . . . |

| No | FEATURE AMOUNT | | | | | UNAUTHORIZED USER |
| | FEATURE AMOUNT 1 | FEATURE AMOUNT 2 | FEATURE AMOUNT 4 | ... | |
| --- | --- | --- | --- | --- | --- |
| 1 | 1 | 4 | 6 | ... | 1 |
| 2 | 0 | 2 | 2 | ... | 0 |
| 3 | 0 | 5 | 0 | ... | 0 |
| ... | ... | ... | ... | ... | ... |

| FEATURE AMOUNT | CALCULATION METHOD | SELECTION FLAG |
|---|---|---|
| FEATURE AMOUNT 1 | SUBSTITUTE OUTPUT FROM PREPROCESSING COMPONENT C1 INTO CALCULATION FORMULA 1 | 1 |
| FEATURE AMOUNT 2 | SUBSTITUTE OUTPUT FROM PREPROCESSING COMPONENT C2 INTO CALCULATION FORMULA 2 | 1 |
| FEATURE AMOUNT 3 | AVERAGE OF OUTPUT FROM PREPROCESSING COMPONENT C3 AND OUTPUT FROM PREPROCESSING COMPONENT C4 | 0 |
| . . . | . . . | . . . |
| FEATURE AMOUNT n | SUBSTITUTE OUTPUT FROM PREPROCESSING COMPONENT C18 INTO CALCULATION FORMULA n | 0 |

LEARNING MODEL APPLYING SYSTEM, A LEARNING MODEL APPLYING METHOD, AND A PROGRAM

CROSS REFERENCE TO RELATED APPLICATIONS

This application is a National Stage of International Application No. PCT/JP2019/035376 filed on Sep. 9, 2019. The contents of the above document is incorporated herein by reference in its entirety.

TECHNICAL FIELD

The one or more embodiments of the present invention relates to a learning model applying system, a learning model applying method, and a program.

BACKGROUND ART

There are known techniques in the field of machine learning for calculating feature amounts of data and training a learning model to learn the data. For example, Patent Literature 1 describes a system for training a learning model to learn training data in which a feature amount extracted from behavior data related to the behavior of a user accessing a website is input and a result of determination of the validity of the user is output so as to create the learning model to detect an unauthorized user.

CITATION LIST

Patent Literature

Patent Literature 1: WO2019/049210A

SUMMARY OF INVENTION

Technical Problem

However, in the conventional technique, even if the behavior of a malicious third party changes, the setting for calculating the feature amount entered in the learning model does not change, and thus it is not possible to attend to changes in the behavior. This may lower the accuracy of the learning model. In this respect, it is conceivable to have a data scientist analyze behavioral changes and change the setting for calculating the feature amount. However, in this case, the analysis by the data scientist and the reflection of the setting take much time and effort, and thus applying the learning model may be delayed.

The one or more embodiments of the present invention have been conceived in view of the above, and an object thereof is to provide a learning model applying system, a learning model applying method, and a program capable of quickly applying a learning model.

Solution to Problem

In order to solve the above described issues, a learning model applying system according to the one or more embodiments of the present invention includes calculating means for calculating a plurality of feature amounts based on data for training used for training a learning model, selecting means for selecting at least one of the plurality of feature amounts based on an impact of each feature amount on the learning model, applying means for applying a trained learning model that is trained based on the feature amount selected by the selecting means, and setting means for performing a setting related to calculation of a feature amount to be entered in the trained learning model based on the feature amount selected by the selecting means.

A learning model applying method according to the one or more embodiments of the present invention includes the steps of calculating a plurality of feature amounts based on data for training used for training a learning model, selecting at least one of the plurality of feature amounts based on an impact of each feature amount on the learning model, applying a trained learning model that is trained based on the feature amount selected in the selecting step, and performing a setting related to calculation of a feature amount to be entered in the trained learning model based on the feature amount selected in the selecting step.

A program according to the one or more embodiments of the present invention for causing a computer to function as calculating means for calculating a plurality of feature amounts based on data for training used for training a learning model, selecting means for selecting at least one of the plurality of feature amounts based on an impact of each feature amount on the learning model, applying means for applying a trained learning model that is trained based on the feature amount selected by the selecting means, and setting means for performing a setting related to calculation of a feature amount to be entered in the trained learning model based on the feature amount selected by the selecting means.

In one aspect of the present invention, the calculating means calculates the plurality of feature amounts based on a plurality of preprocessing components, and among the plurality of preprocessing components, the setting means sets a preprocessing component, which is used in calculation of the feature amount selected by the selecting means, to be used in the calculation of a feature amount to be entered in the trained learning model.

According to one aspect of the present invention, learning model applying system further includes input means for imputing data in a same format in each of the plurality of preprocessing components, wherein each of the plurality of preprocessing components performs calculation processing based on data in a same format as data entered in other preprocessing components.

According to one aspect of the present invention, the learning model applying system further includes adding means for adding a new preprocessing component for calculating a new feature amount, wherein the calculating means calculates the new feature amount based on the new preprocessing component, and in a case where the selecting means selects the new feature amount, the setting means sets the new preprocessing component to be used in the calculation of the feature amount to be entered in the trained learning model.

According to one aspect of the present invention, the learning model applying system further includes obtaining means for obtaining a calculation time of each feature amount, wherein the selecting means selects at least one of the plurality of feature amounts based on an impact of each feature amount on the learning model and the calculation time of each feature amount.

According to one aspect of the present invention, the learning model applying system further includes specifying means for specifying a combination of feature amounts that are related to each other from the plurality of feature amounts, wherein in a case where a combination of feature amounts that are related to each other exists, the selecting means selects a part of the combination.

According to one aspect of the present invention, the learning model applying system further includes obtaining means for obtaining a calculation time of each feature amount, and determining means for determining whether the calculation time of each feature amount is equal to or longer than predetermined time, wherein in a case where a feature amount having its calculation time equal to or longer than the predetermined time, the selecting means treats the feature amount as a missing value and evaluates an impact of the feature amount on the learning model.

According to one aspect of the present invention, the learning model is a model for detecting fraud in a website. The learning model applying system further includes estimating means for estimating, when a user accesses the website, fraud of the user based on the trained learning model and the setting made by the setting means. Processing of each of the selecting means, the applying means, and the setting means is performed as background processing that is different from processing of the estimating means.

According to one aspect of the present invention, the learning model is a model for detecting fraud in a website. The learning model applying system further includes notification means for notifying an administrator of the website of information about a feature amount selected by the selection means.

Effects of the Invention

The one or more embodiments of the present invention allows a learning model to be quickly applied.

BRIEF DESCRIPTION OF THE DRAWINGS

FIG. 4 is a diagram illustrating an example of data storage of a behavior database;

FIG. 5 is a diagram illustrating an example of data storage of a training data set for evaluation;

FIG. 6 is a diagram illustrating an example of data storage of a training data set for production;

FIG. 7 is a diagram illustrating an example of data storage of calculation setting data;

DESCRIPTION OF EMBODIMENTS

1. Overall Configuration of Learning Model Applying System

Figure 1:
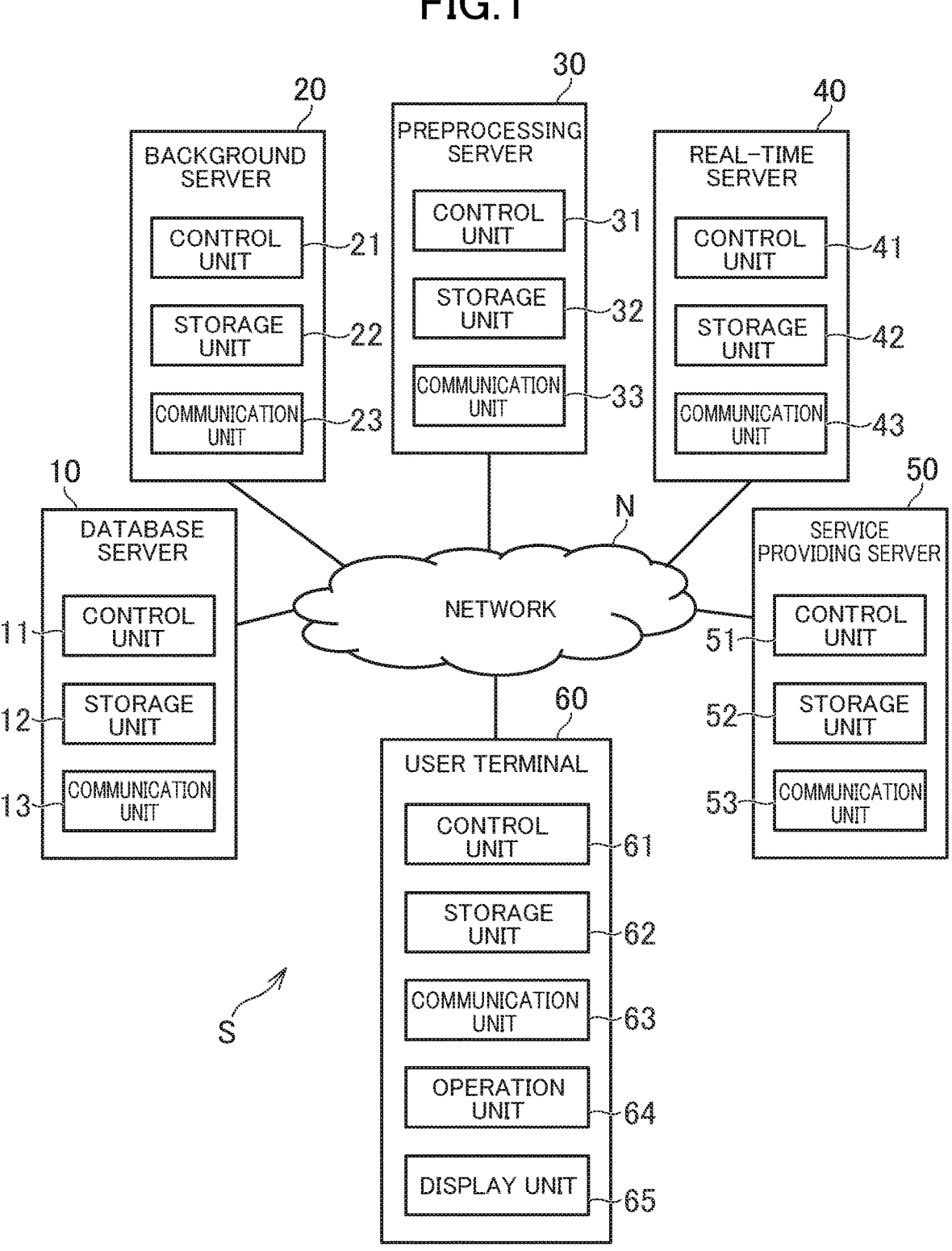
FIG. 1 is a diagram illustrating an overall configuration of a learning model applying system.

An embodiment of a learning model applying system according to the one or more embodiments of the present invention will be described below. FIG. 1 is a diagram illustrating an overall configuration of the learning model applying system. As shown in FIG. 1, the learning model applying system S includes a database server 10, a background server 20, a preprocessing server 30, a real-time server 40, a service providing server 50, and a user terminal 60, which are connectable to a network N such as the Internet.

The database server 10 is a server computer that stores a variety of data. The database server 10 includes a control unit 11, a storage unit 12, and a communication unit 13. The control unit 11 includes at least one processor. The control unit 11 executes processing in accordance with programs and data stored in the storage unit 12. The storage unit 12 includes a main storage unit and an auxiliary storage unit. For example, the main storage unit is a volatile memory such as RAM, and the auxiliary storage unit is a nonvolatile memory such as ROM, EEPROM, flash memory, and hard disk. The communication unit 13 is a communication interface for wired or wireless communication and performs data communication over the network N.

The background server 20 is a server computer that selects a feature amount to be described later and trains a learning model. The background server 20 includes a control unit 21, a storage unit 22, and a communication unit 23. The physical configurations of the control unit 21, the storage unit 22, and the communication unit 23 may be respectively the same as those of the control unit 11, the storage unit 12, and the communication unit 13.

The preprocessing server 30 is a server computer for calculating a feature amount to be described later. The preprocessing server 30 includes a control unit 31, a storage unit 32, and a communication unit 33. The physical configurations of the control unit 31, the storage unit 32, and the communication unit 33 may be respectively the same as those of the control unit 11, the storage unit 12, and the communication unit 13.

The real-time server 40 is a server computer to which a learning model to be described later is applied. The real-time server 40 includes a control unit 41, a storage unit 42, and a communication unit 43. The physical configurations of the control unit 41, the storage unit 42, and the communication unit 43 may be respectively the same as those of the control unit 11, the storage unit 12, and the communication unit 13.

The service providing server 50 is a server computer that provides any service through a website. The service providing server 50 includes a control unit 51, a storage unit 52, and a communication unit 53. The physical configurations of the control unit 51, the storage unit 52, and the communication unit 53 may be respectively the same as those of the control unit 11, the storage unit 12, and the communication unit 13.

The user terminal 60 is a computer operated by a user. For example, the user terminal 60 is a mobile phone (including a smart phone), a portable information terminal (including a tablet computer), and a personal computer, for example. In this embodiment, the user terminal 60 includes a control unit 61, a storage unit 62, a communication unit 63, an operation unit 64, and a display unit 65. The physical configurations of the control unit 61, the storage unit 62, and the communication unit 63 respectively the same as those of the control unit 11, the storage unit 12, and the communication unit 13.

The operation unit 64 is an input device, and is, for example, a pointing device such as a touch panel and a mouse, a keyboard, or a button. The operation unit 64 transmits an operation of the user to the control unit 61. The display unit 65 is, for example, a liquid crystal display unit or an organic EL display unit. The display unit 65 displays images according to an instruction from the control unit 61.

The programs and data described as being stored in the storage units 12, 22, 32, 42, 52, and 62 may be supplied via the network N. Further, the hardware configuration of each computer described above is not limited to the above example, and various types of hardware can be applied. For example, a reading unit (e.g., an optical disk drive or a memory card slot) for reading a computer-readable information storage medium or an input/output unit (e.g., a USB port) for inputting/outputting data to/from an external device may be included. For example, a program or data stored in the information storage medium may be supplied to each computer through the reading unit or the input/output unit.

2. Outline of Learning Model Applying System

Figure 2:
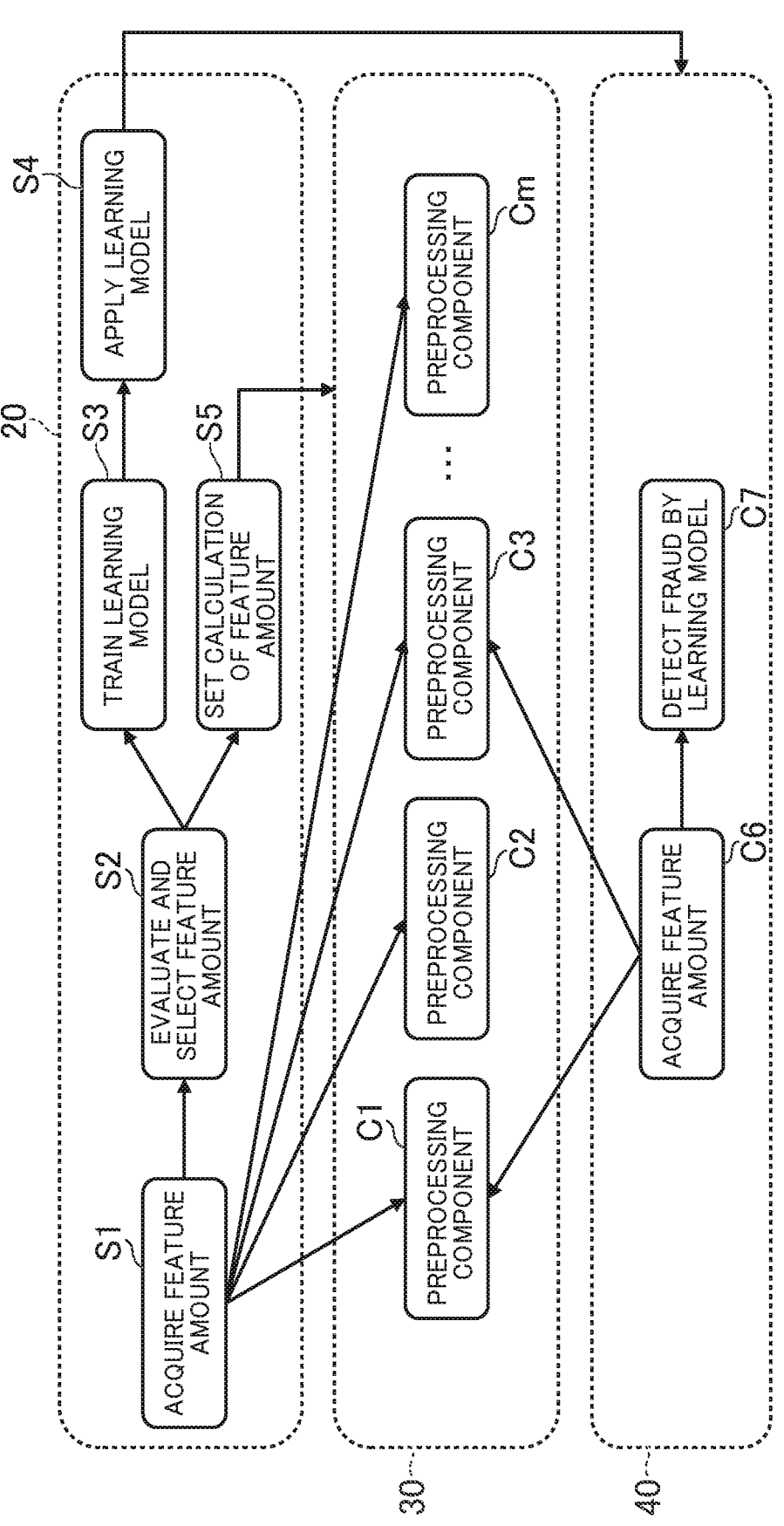
FIG. 2 is a diagram illustrating an outline of the learning model applying system.

FIG. 2 is a diagram illustrating an outline of the learning model applying system S. In this embodiment, the processing of learning model applying system S will be described using a scene in which the service providing server 50 provides a website such as news and video to users and analyzes a behavior of a user who accesses the website. For example, the learning model applying system S generates behavior data when a user accesses a website, analyzes the behavior data using a learning model, and classifies the user as either a normal user or an unauthorized user.

The behavior data is data related to user behavior. The behavior data includes at least one item and stores behaviors of users. The behavior data may be generated for all the users who have accessed the website, or behavior data may be generated only for some of the users. The behavior data may indicate the behavior at a certain point in time, or may indicate a history of behaviors in a certain period of time. For example, the behavior data may indicate time at which a website is accessed, a location of a user when the website is accessed, or content of the user's operation on the website.

A normal user is a user who performs normal behavior and is not an unauthorized user. An unauthorized user is a user who performs illegal behavior and is not a normal user. The illegal behavior is a behavior that is detrimental to service providers or other users, such as hacking, cracking, malicious posting, intentionally making large amounts of access, annoying behavior to other users, violating service agreements, and violating laws.

For example, services for normal users are not restricted, and services for unauthorized users are restricted. However, when a user is classified as an unauthorized user, the service need not be immediately restricted, but may be restricted after an administrator review is performed, or after additional authentication for the user is performed.

The learning model is a model using machine learning. The learning model may also be referred to as a learner, classifier, or classification learner. In this embodiment, a learning model for classifying whether a user is an unauthorized user is used. For the machine learning itself, various known techniques, such as neural network, reinforcement learning, and deep learning, can be used. The machine learning is not limited to supervised learning, and semi-supervised learning may be used, or a learning model based on unsupervised learning may be used.

The behavior data may be directly entered in the learning model, although in this embodiment, a plurality of feature amounts calculated based on the behavior data are entered in the learning model. The learning model classifies the user into either a normal user or an unauthorized user based on the entered feature amounts.

The feature amount indicates characteristics of data to be processed by the learning model. In this embodiment, the behavior data is processed, and thus the feature amount can be referred to as information indicating characteristics of the behavior of the user. The feature amount may be represented by a numerical value, or by other information such as characters. The feature amount may be any characteristic that can be calculated from the behavior data, such as an average distance from the user's access location, elapsed time from the user's previous access, the user's access frequency, and usage of the service by the user (e.g., amount of payment, frequency of payment). In addition, for example, the feature amount may be information expressed in binary values, such as whether the access is from outside the country, or whether a certain period has elapsed since the user registered for the service.

As shown in FIG. 2, the preprocessing server 30 is provided with m (m: a natural number) preprocessing components $C_m$ used in calculating feature amount. The preprocessing component $C_m$ is used not only by the background server 20 but also by the real-time server 40. In this embodiment, assume that the real-time server 40 requires faster processing than the background server 20, and thus the feature amount calculation that cannot be made in time by the processing of the real-time server 40 is not performed. That is, the limit of the processing of the real-time server 40 is the limit of the processing of the background server 20.

In this embodiment, assume that the feature amount that can be calculated with m preprocessing components $C_m$ is n types (n: natural number). All of the n types of feature amounts may be used in learning, although some of the n types of feature amounts have a minor (insignificant for detection of fraud) impact on the learning model. When such a feature amount is learned, the accuracy of the learning model may be decreased or the processing may be time-consuming. As such, in this embodiment, k types of feature amounts (k: a natural number equal to or less than n) having relatively a large impact are selected and learned in the learning model.

In this embodiment, the database server 10 stores a history of various types of behavior data of a user who has accessed the website in the past and a result of determining whether the user is an unauthorized user. The background server 20 acquires the behavior data for the latest predetermined period of time from the database server 10 so as to generate a learning model to be applied to the real-time server 40. The background server 20 transmits the behavior data acquired from the database server 10 to the preprocessing server 30. The background server 20 causes the preprocessing server 30 to exhaustively calculate feature amounts and acquires n types of feature amounts (S1).

The background server 20 evaluates the impact of the feature amounts on the learning model and selects k types of feature amounts from n types of feature amounts (S2). The selection of feature amounts can be performed by a known feature amount selection technique, for example, Filter-Method that completes only with a data set without using a learning model, a Wrapper-Method of searching for optimal feature amount combinations using a learning model, and Embedded-Method of selecting feature amounts at the time of learning.

In this embodiment, k types of feature amounts are selected on the basis of an impact (importance) of each of the n types of feature amounts. The impact of feature amount is described by taking an example where a known method (e.g., a method so-called Permutation Importance for evaluating the degree of difference in the predicted results when only the feature amount to be evaluated is changed) is used. According to this method, a numerical value indicating an impact on the learning model is output for each feature amount. For example, the background server 20 selects k types of feature amounts from n types of feature amounts in descending order of the impact.

The background server 20 trains the learning model based on the selected k types of feature amounts (S3). Of the n types of feature amounts, feature amounts other than the selected k types of feature amounts have a less impact on the learning model. As such, in this embodiment, a feature amount having a small impact is not used in learning, although the feature amount having a small impact may be learned somewhat by lowering the learning coefficients, for example, rather than not being used in the learning at all.

The background server 20 transmits and applies the trained learning model to the real-time server 40 (S4). The k types of feature amounts are entered in the trained learning model, and thus not all of the n types of feature amounts need to be calculated at the time of fraud detection. As such, the background server 20 sets the preprocessing server 30 to calculate only k types of feature amounts instead of calculating all n types of feature amounts (S5). Applying the learning model and setting the calculation of feature amounts may be performed simultaneously, or either one may be performed first.

With the above processing, the real-time server 40 may detect fraud using the applied learning model. For example, when a user accesses the website of the service providing server 50, the service providing server 50 generates behavior data based on the user's behavior on the website. The real-time server 40 collects the generated behavior data and transmits the data to the preprocessing server 30. The real-time server 40 causes the preprocessing server 30 to calculate k types of feature amounts and acquires the calculated feature amounts (S6). Unlike the case where the background server 20 requests the calculation, the preprocessing server 30 does not calculate all of the n types of feature amounts, but calculates only the k types of feature amounts. In the example of FIG. 2, the preprocessing components $c_2$ and $c_m$ that are used to calculate the n types of feature amounts are not used in calculating the k types of feature amounts. Such setting for calculating feature amounts is performed in S5.

The real-time server 40 inputs the k types of feature amounts received from the preprocessing server 30 to the applied learning model, and detects fraud (S7). When receiving an output indicating that the user is an unauthorized user from the learning model, the real-time server 40 requests additional authentication for the user or restricts the service to be provided.

In the fraud detection described above, the behavior of a malicious third party changes daily, and thus the type of feature amount having a large impact on the learning model may change. For example, even if the important feature amount for fraud detection is "average distance from the access location" at a certain time, when the behavior of the malicious third party changes, the important feature amount important for fraud detection may be changed to "elapsed time from the previous access." In this case, the old learning model cannot respond to the change in the behavior and the user's fraud cannot be detected, and thus it is preferable to train the learning model to learn the feature amount of "time elapsed from the previous access" instead of the feature amount of "average distance from the access location."

As such, the learning model applying system S periodically evaluates the impacts of feature amounts on the learning model and reselects the feature amounts to be learned by the learning model. If the type of the feature amount selected by the background server 20 changes, setting for calculating the feature amount by the preprocessing server 30 need to be changed accordingly. As such, the background server 20 changes the setting of the preprocessing server 30 so as to calculate the latest feature amount.

For example, suppose that the preprocessing components $c_1$, $c_2$, and $c_5$ are needed to calculate $k_1$ types of feature amounts selected at a time $t_1$. In this case, the setting of the preprocessing server 30 at the time $t_1$ is set to calculate $k_1$ types of feature amounts using the preprocessing components $c_1$, $c_2$, and $c_5$. The learning model applied at the time $t_1$ is populated with $k_1$ types of feature amounts calculated using the preprocessing components $c_1$, $c_2$, and $c_5$.

At a subsequent time $t_2$, assume that behavior of the malicious third party is changed and the impact of $k_2$ types of feature amounts increases. In this case, assume that the combination of $k_1$ types of feature amounts and the combination of $k_2$ types of feature amounts do not exactly match, and the preprocessing components $c_1$, $c_3$, and $c_4$ are needed to calculate the $k_2$ types of feature amounts. The setting of the preprocessing server 30 at the time $t_2$ is changed to calculate the $k_2$ types of feature amounts using the preprocessing components $c_1$, $c_3$, and $c_4$. The learning model applied at the time $t_2$ is populated with the $k_2$ types of feature amounts calculated using the preprocessing components $c_1$, $c_3$, and $c_4$.

As described above, even if the behavior of the malicious third party changes, the learning model applying system S according to this embodiment selects the feature amounts corresponding to the change and trains the learning model so as to attend to the change in the behavior. Further, the learning model applying system S applies a trained learning model as well as performs the setting so as to calculate feature amounts required for the latest learning model, thereby quickly applying the learning model. Details of this technique will be described below.

3. Functions Implemented in Learning Model Applying System

Figure 3:
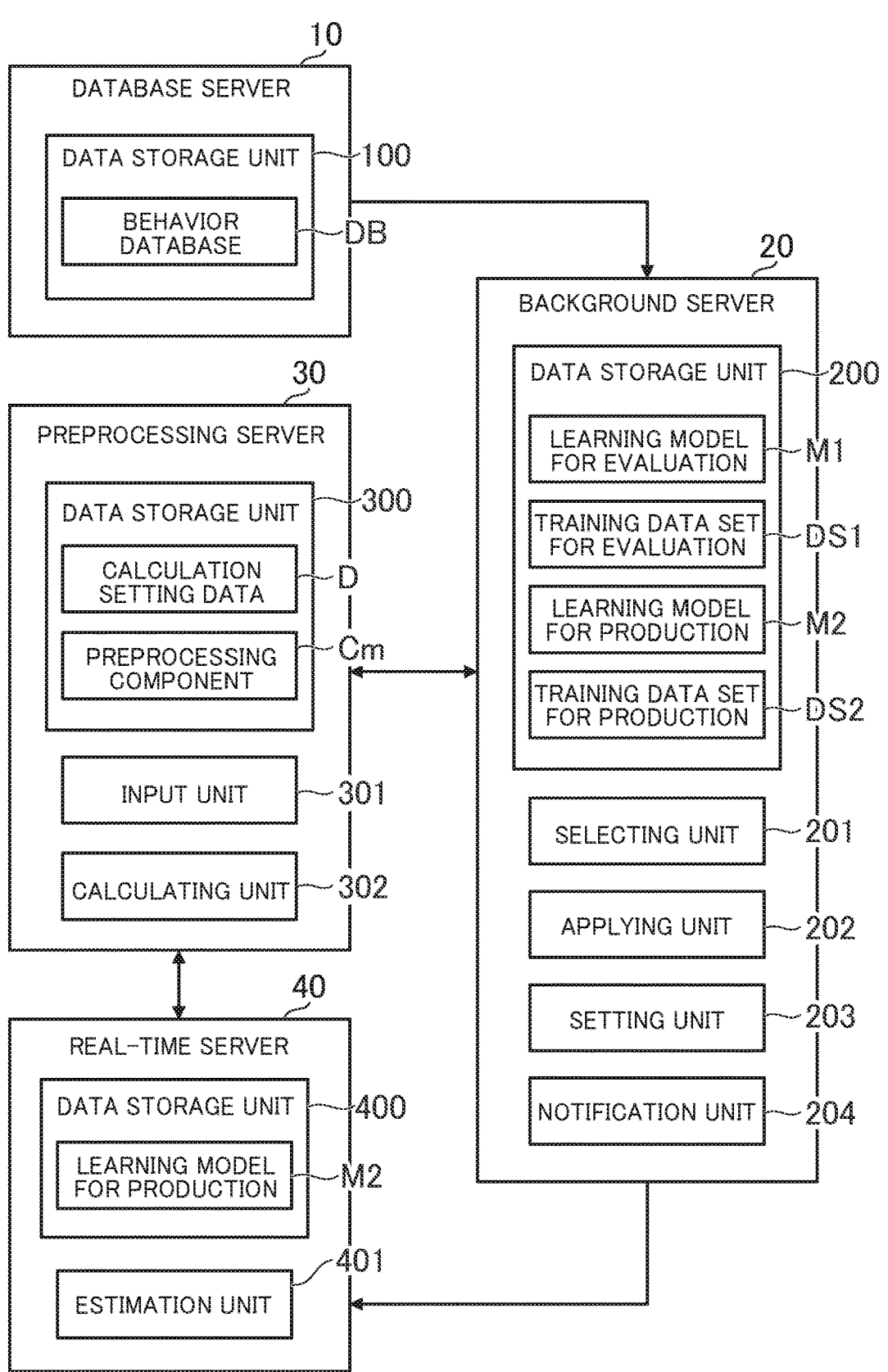
FIG. 3 is a functional block diagram showing an example of functions implemented in the learning model applying system.

FIG. 3 is a functional block diagram showing an example of functions implemented in the learning model applying system S. The functions implemented in the database server 10, the background server 20, the preprocessing server 30, and the real-time server 40 will be described below.

3-1. Functions Implemented in the Database Server

As shown in FIG. 3, the data storage unit 100 is implemented in the database server 10. The data storage unit 100 is implemented mainly by the storage unit 12. The data storage unit 100 stores data required for learning. In this embodiment, a behavior database DB will be described as an example of the data stored in the data storage unit 100.

FIG. 4 is a diagram illustrating an example of data storage of the behavior database DB. As shown in FIG. 4, the behavior database DB is a database in which the history of behavior in the past is stored. For example, the behavior database DB stores behavior data generated in the past and a fraud flag indicating whether the user is an unauthorized user in association with each other.

"No" shown in FIG. 4 is a record number for identifying an individual record in the behavior database DB. In this embodiment, assume that the data in the data base is uniquely identified by the record number. In this embodiment, the fraud flag is stored in the behavior database DB, although the fraud flag may not be stored in the behavior database DB. In this case, when a training data set DS1 for evaluation to be described later is generated, the fraud flag may be assigned.

The behavior data may store any information, such as a user ID, a user name, an IP address, a URL of an accessed website, an access location, an access date and time, a payment amount, and a payment date and time. As described above, these histories may be stored in the behavior data. When the behavior data stores the history of behaviors, statistical feature amounts such as the average distance from the access location of the user, the elapsed time from the previous access of the user, and the access frequency of the user can be calculated by one piece of behavior data. If the behavior data does not store the history of behaviors, these statistical feature amounts are calculated from the plurality of pieces of behavior data. The information included in the behavior data is not limited to the examples above, and may include other information such as content entered from the operation unit 64.

The user ID is information that uniquely identifies a user. The user name is a name entered by the user at the time of use registration. The IP address is an IP address of the user terminal 60 used when the user accesses the service providing server 50. The access location is information about a location of the user terminal 60 used when the user accesses the service providing server 50. The access location is estimated using the IP address, GPS information (latitude/longitude information or coordinate information), radio base station information, or access point information, for example. The access date and time is the date and time when the user accesses the service providing server 50. The settlement amount is an amount paid by the user, and is, for example, an amount for pay service and purchasing a product. The settlement date and time is the date and time when the settlement is made, and is, for example, the date and time when the service is used and the date and time of purchasing the product.

The fraud flag is information indicating whether the user is an unauthorized user. If the fraud flag has a first value (ON), it means that the user is an unauthorized user, and if the fraud flag is a second value (OFF), it means that the user is a legitimate user (not an unauthorized user). The value of the fraud flag is information that is the correct answer for the learning model, and designated by an administrator, for example. The administrator may input the value of the fraud flag for all the behavior data, or may review the determination result of the learning model to correct only the wrong value.

For example, the database server 10 acquires behavior data from the real-time server 40 or the service providing server 50, issues a new record number, and stores the behavior data in the behavior database DB. The administrator reviews the behavior data stored in the behavior database DB and specifies a value of the fraud flag. When the service providing server is accessed, the database server 10 acquires and stores the behavior data in the behavior database DB together with the fraud flag designated by the administrator. The content of the behavior database DB is provided to the background server 20.

3-2. Functions Implemented in Background Server

As shown in FIG. 3, the background server 20 includes a data storage unit 200, a selecting unit 201, an applying unit 202, a setting unit 203, and a notification unit 204. The processing of the selecting unit 201, the applying unit 202, and the setting unit 203 are executed as background processing different from the processing of the estimation unit 401 in the real-time server 40.

In this embodiment, the background processing is executed by a computer other than the computer to which a learning model M2 for production is applied. In other words, the background processing and the real-time processing are executed on different computers. The background processing may be executed on the same computer as the real-time processing, but in this case, the real-time processing is executed in preference to the background processing. For example, the background processing is performed in a time zone in which the frequency of real-time processing is relatively low.

[Data Storage Unit]

The data storage unit 200 is implemented mainly by the storage unit 22. The data storage unit 200 stores data needed to select feature amounts and apply the learning model. In this embodiment, as an example of the data stored in the data storage unit 200, a learning model M1 for evaluation, a training data set DS1 for evaluation, a learning model M2 for production, and a training data set DS2 for production will be described.

The learning model M1 for evaluation is a model used to evaluate each of the n types of feature amounts. In other words, the learning model M1 for evaluation is a model used to select k types of feature amounts having a relatively large impact from the n types of feature amounts. In this embodiment, the learning model M1 for evaluations is used only for selecting the feature amounts, and thus is not applied to the real-time server 40. If the learning model is not used to evaluate the impact of feature amounts as in the Filter-Method, the learning model M1 for evaluation is not stored in the data storage unit 200.

The data storage unit 200 stores programs (algorithms) and parameters of the learning model M1 for evaluation. The training data set DS1 for evaluation is learned in the learning model M1 for evaluation, and for example, the parameters of the learning model M1 for evaluation are adjusted by the training data set DS1 for evaluation. A known method may be used for the learning method, such as, a learning method of a neural network. The learning model M1 for evaluation is trained so as to obtain a relationship between input and output of training data for evaluation, which will be described later.

FIG. 5 is a diagram showing an example of data storage of the training data set DS1 for evaluation. As shown in FIG. 5, the training data set DS1 for evaluation stores training data to be learned by the learning model M1 for evaluation. The number of pieces of training data may be freely determined, for example, about ten to several hundred, or 1000 or more. In this embodiment, a piece of training data stored in the training data set DS1 for evaluation is referred to as training data for evaluation. The training data for evaluation is individual records in FIG. 5, and the training data set DS1 for evaluation is a collection of training data for evaluation.

The training data for evaluation indicates the relationship between the input and the output in the learning model M1 for evaluation. In this embodiment, the relationship between all of the n types of feature amounts and the fraud flags are shown in the training data for evaluation. In this embodiment, assume that the training data for evaluation is generated for each of behavior data stored in the behavior database DB. As such, the behavior data stored in the behavior database DB and the training data stored in the training data set DS1 for evaluation correspond to each other in a one-to-one manner.

For example, n types of feature amounts are calculated from the behavior data of "1" as "No" in the behavior database DB of FIG. 4, and stored as the feature amounts in the training data of "1" as "No" in the evaluation database of FIG. 5. The fraud flag stored in the behavior data is stored as it is as the fraud flag of the training data. In this manner, the training data for evaluation indicating the relation between the n types of feature amounts and the fraud flags is generated for the behavior data for the latest predetermined period of time in the behavior database DB.

In this embodiment, a case in which the training data for evaluation is generated for the behavior data for the latest predetermined period of time in the behavior database DB will be described, although the training data for evaluation may be generated for all the behavior data in the behavior database DB. As another example, the training data for evaluation may be generated for only a part of the behavior data randomly selected from the behavior database DB, or only for the behavior data indicating the behavior of a specific user.

The learning model M2 for production is a learning model trained by k types of feature amounts selected by the selecting unit 201. In other words, the learning model M2 for production is a learning model to be applied to the real-time server 40, or a learning model that has already been applied to the real-time server 40. The learning model M2 for production can also be referred to as the latest learning model.

The data storage unit 200 stores programs (algorithms) and parameters of the learning model M2 for production. The training data set DS2 for production is learned in the learning model M2 for production, and for example, the parameters of the learning model M2 for production are adjusted by the training data set DS2 for production. A known method may be used for the learning method, such as, a learning method of a neural network. The learning model M2 for production is trained so as to obtain a relationship between input and output of training data for production, which will be described later.

FIG. 6 is a diagram illustrating an example of data storage of the training data set DS2 for production. As shown in FIG. 6, the training data set DS2 for production stores training data to be learned by the learning model M2 for production. The number of pieces of training data may be freely determined, for example, about ten to several hundred, or 1000 or more. In this embodiment, the individual records stored in the training data set DS2 for production are described as training data for production. The training data for production is an individual record in FIG. 6, and the production training data set DS2 is a collection of training data for production.

The training data for production indicates the relationship between the input and the output in the learning model M2 for production. In this embodiment, the relationship between k types of feature amounts and the fraud flags are indicated in the training data for production. In this embodiment, the training data for production is generated for each training data for evaluation stored in the training data set DS1 for evaluation. For this reason, the training data for production and the training data for evaluation correspond to each other on a one-to-one basis.

For example, k types of feature amounts out of the n types of feature amounts of the training data of "1" as "No" in the training data set DS1 for evaluation in FIG. 5 are stored as feature amounts of the training data for production. The fraud flag stored in the training data for evaluation is stored as it is as the fraud flag of the training data for production. In this manner, for all the training data stored in the training data set DS1 for evaluation, training data for production indicating the relationship between k types of feature amounts and fraud flags is generated.

In this embodiment, a case in which the training data for production is generated for all the training data for evaluation stored in the training data set DS1 for evaluation will be described, although the training data for production may be generated for only a part of the training data set DS1 for evaluation. As another example, the training data for production may be generated based on behavior data that is not included in the training data set DS1 for evaluation. For example, k types of feature amounts may be selected based on several tens of pieces of training data for evaluation, and then the evaluation data for production may be generated from several hundred to several thousand pieces of behavior data.

[Selecting Unit]

The selecting unit 201 is mainly implemented by the control unit 21. The selecting unit 201 selects at least one of a plurality of feature amounts based on an impact of each feature amount on the learning model. In this embodiment, the learning model M1 for evaluation is prepared, and thus the selecting unit 201 evaluates an impact of each feature amount based on the learning model M1 for evaluation.

The impact of a feature amount is an impact to output of the learning model. In other words, an impact of a feature amount may be a degree to which the learning model is focused, importance in the output of the learning model, or basis for which the learning model determines content of the output. For example, an impact of a feature amount is indicated by degree of influence calculated by known feature amount selection techniques, such as Permutation Importance and Gini Importance. In this embodiment, the impact is indicated by a numerical value, but the impact of a feature amount may be indicated by other information such as characters. The larger the numerical value indicating the impact is, the larger the impact is. For example, an impact of a feature amount is calculated by calculating how much the output is influenced when the value of the feature amount is changed. The greater the impact to the output, the greater the numerical value indicating the degree of impact.

The selecting unit 201 can select any number of feature amounts, and may select, for example, only one feature amount or a plurality of feature amounts. Further, the selecting unit 201 may select all of the n types of feature amounts (in this case, the numerical value of n is the same as the numerical value of k), or may select only a part of the n types of feature amounts (in this case, the numerical value of k is smaller than the numerical value of n).

The selecting unit 201 selects k types of feature amounts having a relatively higher impact on the learning model among the n types of feature amounts. For example, the selecting unit 201 acquires an impact of each of the n types of feature amounts stored in the training data set DS1 for evaluation, and selects k types of feature amounts based on the acquired impacts. For example, the selecting unit 201 selects k types of feature amounts in descending order of the impacts. Further, for example, the selecting unit 201 may select all feature amounts having the impact equal to or greater than a threshold value. In this case, the number of feature amounts having the impact greater than or equal to the threshold value is a numerical value of k. Further, for example, the selecting unit 201 may select a top predetermined percentage of the feature amounts having the higher impacts. In this case, the number of the top predetermined percentage of the feature amounts having the higher impacts is a numerical value of k.

[Applying Unit]

The applying unit 202 is mainly implemented by the control unit 21. The applying unit 202 applies the learning model trained based on the feature amounts selected by the selecting unit 201. The trained learning model is a model that is trained based on the training data including k types of feature amounts selected by the selecting unit 201. In this embodiment, the learning model M2 for production corresponds to the trained learning model. As such, the part described as the learning model M2 for production in this embodiment may be read as a trained learning model.

To apply is to replace the learning models. As such, to apply may also be described as to export, switch, overwrite, or activate. In this embodiment, the learning model M2 for production is applied to the real-time server 40, and thus the applying unit 202 applies the learning model M2 for production by transmitting the learning model M2 for production trained by the training data set DS2 for production to the real-time server 40.

[Setting Section]

The setting unit 203 is mainly implemented by the control unit 21. The setting unit 203 sets up the calculation of feature amounts entered in the learning model M2 for production based on the feature amounts selected by the selecting unit 201.

The setting up the calculation of the feature amount is to set whether to calculate a feature amount. In other words, the setting for the calculation of feature amount is to calculate a feature amount selected by the selecting unit 201 and not to calculate a feature amount that is not selected by the selecting unit 201. In this embodiment, the k types of feature amounts out of the n types of feature amounts are selected, and thus, the setting unit 203 exclude the feature amounts other than the k types of feature amounts from calculation targets. Information identifying whether to calculate each feature amount is indicated in calculation setting data D to be described later. As such, the setting unit 203 sets whether to calculate a feature amount by setting the information stored in the calculation setting data D.

In this embodiment, a feature amount is calculated using the preprocessing components $C_m$, and thus, among the plurality of preprocessing components $C_m$, the setting unit 203 sets up the calculation such that the preprocessing component $C_m$ used in the calculation of the feature amount selected by the selecting unit 201 is used in the calculation of the feature amount to be entered in the trained learning model. The information indicating whether to use the preprocessing component $C_m$ is indicated in the calculation setting data D to be described later. As such, the setting unit 203 sets the information stored in the calculation setting data D, thereby setting the preprocessing component $C_m$ to be used. The setting unit 203 sets up the calculation in which the preprocessing component $C_m$ required for calculating the feature amount selected by the selecting unit 201 is used and the other preprocessing components $C_m$ are not used.

[Notification Unit]

The notification unit 204 is mainly implemented by the control unit 21. The learning model of this embodiment is a model for detecting fraud on websites, and thus, the notification unit 204 notifies an administrator of a website of information on the feature amount selected by the selecting unit 201. The administrator of the website is a provider of the service, and is, for example, not a data scientist who analyzes learning models, but a person in charge on the business side. Any medium may be used for the notification, and for example, an electronic mail, a message application, an SNS, an SMS, a chat, and an electronic bulletin board may be used.

The information on the feature amount is information indicating content of the feature amount selected by the selecting unit 201. For example, if the feature amount of "average distance from the access location" is selected, the notification unit 204 notifies that the "average distance from the access location" is selected, and if the feature amount of "elapsed time from the previous access" is selected, the notification unit 204 notifies that the "elapsed time from the previous access" is selected. The administrator of the website checks the notified feature amount and changes the design of the website or changes the specifications for providing services.

3-3. Functions Implemented in Preprocessing Server

As shown in FIG. 3, a data storage unit 300, an input unit 301, and a calculating unit 302 are implemented in the preprocessing server 30.

[Data Storage Unit]

The data storage unit 300 is implemented mainly by the storage unit 32. The data storage unit 300 stores data required for calculating a feature amount. In this embodiment, as an example of the data stored in data storage unit 300, the calculation setting data D and the preprocessing component $C_m$ will be described. In FIG. 3, only one preprocessing component $C_m$ is shown, although in practice, m preprocessing components $C_m$ are stored. The data storage unit 300 stores, for example, programs and formulas included in the preprocessing component $C_m$.

FIG. 7 is a diagram illustrating an example of data storage of the calculation setting data D. As shown in FIG. 7, a calculation method and a selection flag are stored in the calculation setting data D for each feature amount that can be calculated by the preprocessing server 30. In other words, the calculation setting data D stores the calculation method and the selection flag for each of the n types of feature amounts.

For example, information for identifying the preprocessing component $C_m$ used in the calculation of a feature amount is stored as the calculation method. In this embodiment, the preprocessing component $C_m$ performs the preprocessing required to calculate a feature amount, and thus, a calculation formula for calculating a feature amount from a value output from the preprocessing component $C_m$ is stored as the calculation method. If the preprocessing component $C_m$ calculates a feature amount itself, a feature amount output from the preprocessing component $C_m$ may be obtained, and thus the calculation formula is not specifically shown in the calculation setting data D.

The selection flag is information indicating whether a feature amount is selected by the selecting unit 201. In other words, the selection flag indicates whether a feature amount is included in k types of feature amounts. If the selection flag is a first value (ON), it means that a feature amount is selected by the selecting unit 201, and if the selection flag is a second value (OFF), it means that a feature amount is not selected by the selecting unit 201. The value of the selection flag is set by the setting unit 203 to be described later.

[Input Unit]

The input unit 301 is mainly implemented by the control unit 31. The input unit 301 populates the preprocessing component $C_m$ with the data required for calculating a feature amount. In this embodiment, each behavior data has the same format, and the input unit 301 enters data of the same format in each preprocessing component $C_m$. For example, the input unit 301 enters the behavior data to be processed into each preprocessing component $C_m$ in the form as it is. Further, for example, when the behavior data is processed, the input unit 301 enters the behavior data processed in the same manner into each preprocessing component $C_m$.

A preprocessing component $C_m$ performs calculation processing based on data of the same format as the data entered into the other preprocessing components $C_m$. A preprocessing component $C_m$ may perform calculation processing based on a calculation formula predetermined for the preprocessing component $C_m$, and may perform, for example, aggregation processing, average value calculation processing, standard deviation calculation processing, probability distribution creation processing, or other statistical value calculation processing. If the preprocessing component $C_m$ calculates a feature amount itself, the preprocessing component $C_m$ performs calculation processing of the feature amount.

[Calculating Unit]

The calculating unit 302 is mainly implemented by the control unit 31. The calculating unit 302 calculates a plurality of feature amounts based on the data used for training the learning models. The data for training may be any data used for training the learning model, and may indicate the training data itself, or the data from which the training data is generated. In this embodiment, the behavior data corresponds to the data for training. As such, the part described as the behavior data in this embodiment may be read as the data for training.

The calculating unit 302 may calculate a feature amount based on a predetermined calculation formula. In this embodiment, the calculation method of a feature amount is defined in the calculation setting data D, and thus the calculating unit 302 calculates a feature amount based on the calculation method indicated in the calculation setting data D. In this embodiment, a plurality of preprocessing components $C_m$ are provided, and thus the calculating unit 302 calculates a plurality of feature amounts based on the plurality of preprocessing components $C_m$.

For example, when receiving a calculation request from the background server 20, the calculating unit 302 calculates all of the n types of feature amounts. That is, the calculating unit 302 exhaustively calculates computable feature amounts using the preprocessing component $C_m$. On the other hand, when receiving a calculation request from the real-time server 40, the calculating unit 302 calculates the k types of feature amounts and does not calculate the other feature amounts. The calculation setting data D indicates information on which feature amount is to be calculated, and thus the calculating unit 302 refers to the calculation setting data D to specify a feature amount to be calculated, and calculates the specified feature amount.

3-4. Functions Implemented in Real-Time Server

As shown in FIG. 3, a data storage unit 400 and an estimation unit 401 are implemented in the real-time server 40.

[Data Storage Unit]

The data storage unit 400 is implemented mainly by the storage unit 42. The data storage unit 400 stores the learning model M2 for production. The learning model M2 for production stored in the data storage unit 400 is the same as the learning model M2 for production stored in the data storage unit 200, and thus the explanation thereof is omitted. When a new learning model M2 for production is applied by the applying unit 203, the learning model M2 for production stored in the data storage unit 400 is replaced.

[Estimation Section]

The estimation unit 401 is mainly implemented by the control unit 41. The learning model of the present embodiment is a model for detecting fraud on websites, and when a user accesses a website, the estimation unit 401 estimates fraud of the user based on the trained learning model and the setting performed by the setting unit 203. For example, the service providing server 50 generates behavior data of the user who has accessed the website and transmits the behavior data to the real-time server 40. The estimation unit 401 requests the preprocessing server 30 to calculate a feature amount of the behavior data of the user who has accessed the website. The estimation unit 401 enters the k types of feature amounts received from the preprocessing servers 30 in the learning model M2 for production. The learning model M2 for production classifies the user as either an unauthorized user or a normal user based on the entered feature amount. The estimation unit 401 acquires the classification result from the learning model M2 for production, and estimates the user's fraud.

4. Processing Executed in this Embodiment

Next, the processing executed in the learning model applying system S will be described. In this embodiment, background processing for selecting a feature amount and applying a learning model M2 for production, and real-time processing for detecting fraud of a user who accesses a website will be described.

4-1. Background Processing

Figure 8:
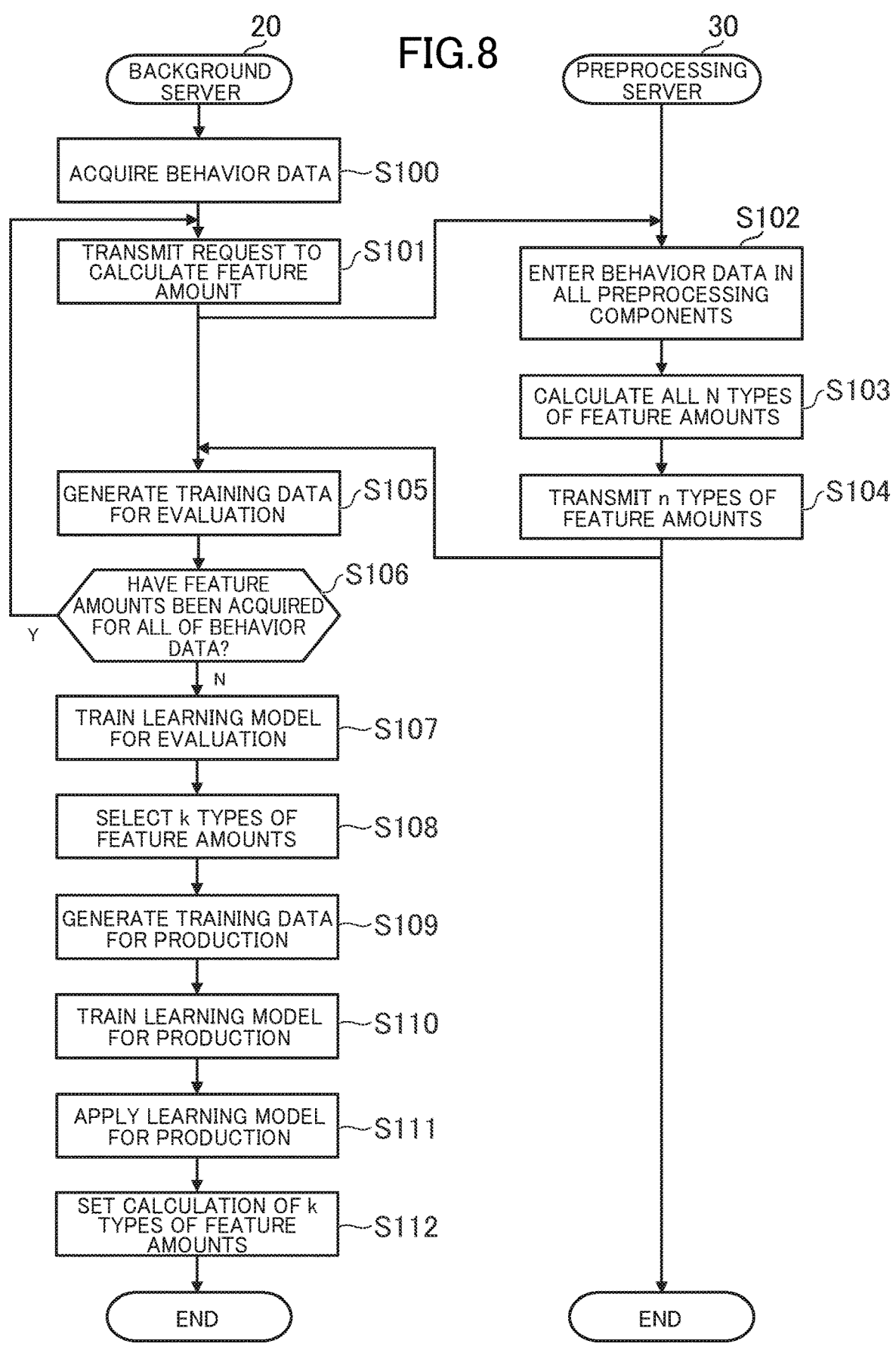
FIG. 8 is a flow chart illustrating an example of background processing.

FIG. 8 is a flow chart illustrating an example of the background processing. The background processing shown in FIG. is executed by the control units 21 and 31 operating in accordance with the programs stored in the storage units 22 and 32, respectively. The processing described below is an example of processing executed by the functional blocks shown in FIG. 3. In this regard, the background processing may be executed at any timing, and may be executed when a predetermined date and time arrives, or when the accuracy of the current learning model M2 for production is lowered.

As shown in FIG. 8, the background server 20 acquires the behavior data stored in the behavior database DB from the database server 10 (S100). In S100, the background server 20 requests the database server 10 to acquire the behavior data. Upon receiving the request, the database server 10 acquires the behavior data for the latest predetermined period of time from the behavior database DB and transmits the acquired behavior data to the background server 20.

The background server 20 transmits a request to the preprocessing server 30 to calculate a feature amount based on the behavior data acquired in S100 (S101). The calculation request in S101 may be performed by transmitting data in a predetermined format, and for example, the behavior data acquired in S100 is included in such data.

Upon receiving the calculation request from the background server 20, the preprocessing server 30 enters each behavior data included in the calculation request in all of the preprocessing components $C_m$ (S102). In S102, the preprocessing server 30 directly enters the behavior data to all of the preprocessing components $C_m$, and thus the behavior data having the same format is entered in all of the preprocessing components $C_m$.

The preprocessing server 30 calculates all n types of feature amounts based on the calculation method defined in the calculation setting data D and the values output from the preprocessing components $C_m$ (S103). In S103, the preprocessing server 30 substitutes a value output from the preprocessing component $C_m$ into a predetermined calculation formula for each feature amount, thereby calculating the values of feature amounts. When the preprocessing component $C_m$ calculates a feature amount, the preprocessing server 30 simply acquires a value output from the preprocessing component $C_m$ as a feature amount without substituting the calculation formula.

The preprocessing server 30 transmits the n types of feature amounts calculated in S103 to the background server 20 (S104).

Upon receiving the n types of feature amounts, the background server 20 generates training data for evaluation and adds the generated data to the training data set DS1 for evaluation (S105). In S105, the background server 20 generates the training data in which the n types of feature amounts received from the preprocessing server 30 are input and the fraud flags of the behavior data are output.

The background server 20 determines whether the n types of feature amounts have been acquired for all the behavior data acquired in S5100 (S106). If it is determined that there is behavior data for which the feature amount has not yet been acquired (S106;N), the processing returns to S101 and the feature amount of the next behavior data is calculated.

On the other hand, if it is determined that feature amounts of all the behavior data is obtained (S106;Y), the background server 20 trains the learning model M1 for evaluation based on the training dataset DS1 for evaluation (S107). In S107, the background server 20 adjusts the parameters of the learning model M1 for evaluation based on known learning algorithms so as to obtain the input-output relationship indicated by the training data set DS1 for evaluation.

The background server 20 selects k types of feature amounts from the n types of feature amounts based on the impacts of the respective feature amounts in the learning model M1 for evaluation (S108). In S108, the background server 20 acquires the impacts of the respective n types of feature amounts, and selects the k types of feature amounts in descending order of the impacts.

The background server 20 generates training data for production based on the k types of feature amounts selected in S108 (S109). In S109, the background server 20 generates, for each training data for evaluation, training data in which the k types of feature amounts among the n types of feature amounts of the training data are input and the fraud flags of the training data are output.

The background server 20 trains the learning model M2 for production based on the training data set DS2 for production (S110). In S110, the background server 20 adjusts the parameters of the learning model M2 for production based on known learning algorithms so as to obtain the input-output relationship indicated by the training data set DS2 for production.

The background server 20 applies the learning model M2 for production to the real-time server 40 (S111). In S111, the background server 20 transmits the learning model M2 for production to the real-time server 40. Upon receiving the learning model M2 for production, the real-time server 40 replaces the learning model M2 for production that has been used with the newly received learning model M2 for production.

The background server 20 sets the preprocessing server 30 regarding the calculation of the k types of feature amounts (S112), and this processing terminates. In S112, the background server 20 transmits a setting instruction to the preprocessing server 30 including information for identifying each of the k types of feature amounts. Upon receiving the setting instruction, the preprocessing server 30 updates the values of the selection flags of the calculation setting data D. This enables to calculate the k types of feature amounts in response to the calculation request from the real-time server 40.

4-2. Real-Time Processing

Figure 9:
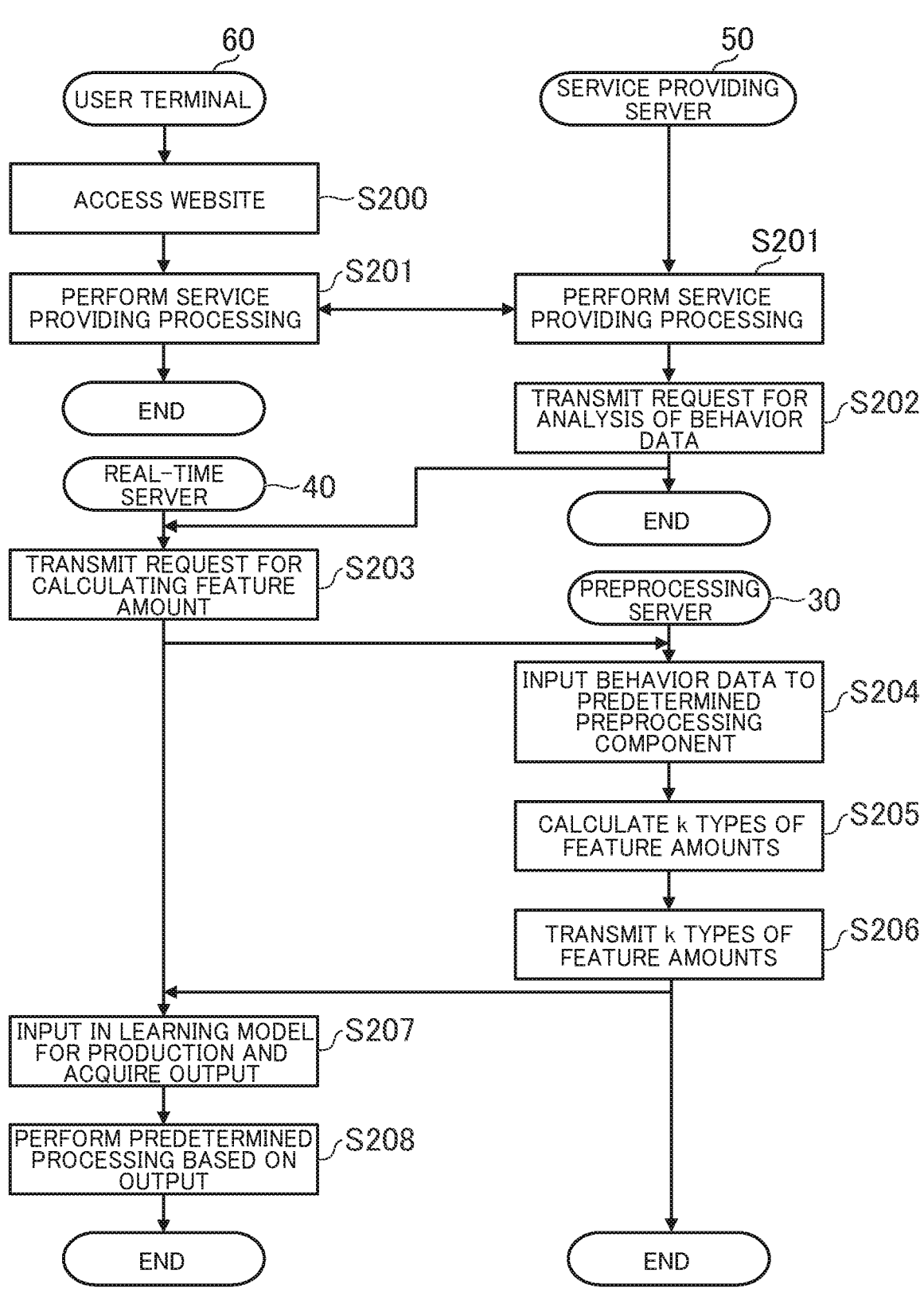
FIG. 9 is a flow chart illustrating an example of real-time processing.

FIG. 9 is a flow chart showing an example of real-time processing. The real-time processing shown in FIG. 9 is executed by the control units 31, 41, 51, and 61 operating in accordance with the programs stored in the storage units 32, 42, 52, and 62, respectively. The processing described below is an example of processing executed by the functional blocks shown in FIG. 3.

As shown in FIG. 9, the user terminal 60 accesses a website provided by the service providing server 50 (S200). In S200, the user terminal 60 accesses the website when a user operates the operation unit 64 to enter a URL for the website or specifies a link containing the URL. The user has already logged in to the service providing server 50, and the service providing server 50 can specify which user is accessing.

Subsequently, service providing processing is performed between the service providing server 50 and the user terminal 60 (S201). In S201, for example, news and video are provided to the user through the website in response to the user's operation. When the user performs an operation of purchasing a pay service, a settlement processing is executed based on settlement information on a credit card previously registered in the service providing server 50. Upon receiving the user's operation from the user terminal 60, for example, the service providing server 50 stores the user's operation as the user behavior.

The service providing server 50 generates behavior data of the user accessing the website based on the processing result in S201, and transmits a request for analysis of the behavior data to the real-time server 40 (S202).

Upon receiving the analysis request, the real-time server 40 transmits a request for calculating feature amounts to the preprocessing server 30 (S203). The calculation request in S203 may be performed by transmitting data in a predetermined format, for example, the behavior data received from the service providing server 50 is included in such data.

Upon receiving the calculation request from the real-time server 40, the preprocessing server 30 inputs the behavior data included in the calculation request to a predetermined preprocessing component $C_m$ for calculating the k types of feature amounts based on the calculation setting data D (S204). In S204, the preprocessing server 30 directly inputs the behavior data to the preprocessing component $C_m$ for calculating the k types of feature amounts, and thus the behavior data of the same type is entered in the preprocessing components $C_m$.

The preprocessing server 30 calculates the k types of feature amounts based on the calculation method defined in the calculation setting data D and the values output from the preprocessing components $C_m$ (S205). In S205, the preprocessing server 30 substitutes a value output from the preprocessing components $C_m$ into a predetermined calculation formula for each feature amount, thereby calculating the values of feature amounts. When the preprocessing components $C_m$ calculates the feature amounts, the preprocessing server 30 simply acquires the values output from the preprocessing components $C_m$ as feature amounts without substituting the calculation formula.

The preprocessing server 30 transmits the k types of feature amounts calculated in S205 to the real-time server 40 (S206).

Upon receiving the k types of feature amounts of the behavior data for which the calculation request is made, the background server 20 enters the k types of feature amounts in the current learning model M2 for production, and acquires the output from the learning model (S207). In S207, the background server 20 enters the k types of feature amounts as k-dimensional vectors in the learning model M2 for production. The learning model M2 for production outputs a value indicating either an unauthorized user or a normal user based on the entered k-dimensional vectors.

The control unit 41 performs predetermined processing based on the output from the learning model M2 for production (S208), and the processing terminates. In S208, if the output from the learning model M2 for production indicates an unauthorized user, the control unit 41 notifies the administrator of such information or asks the user for additional authentication. On the other hand, if the output from the learning model M2 for production indicates a normal user, no service restriction is particularly performed.

The learning model applying system S according to the present embodiment selects at least one feature amount and applies the learning model M2 for production based on the impacts of the respective feature amounts on the learning model, and performs the setting related to the calculation of the feature amount to be entered in the learning model M2 for production, thereby quickly applying the learning model M2 for production. For example, it is possible to save the time and effort required for a data scientist to analyze feature amounts and perform the setting, and to thereby quickly attend to a change in the behavior of the malicious third party. Further, in a case where a feature amount having a relatively small impact on the learning model is excluded from the learning target, the feature amounts to be learned can be narrowed down to feature amounts having a relatively large impact on the learning model. As a result, the accuracy of the learning model can be improved. Further, a feature amount having a relatively small impact on the learning model is not entered in the learning model M2 for production, and thus such feature amount can be excluded from the calculation target. This eliminates the need of calculating an unnecessary feature amount, and serves to reduce the processing burden on the preprocessing server 30. Further, the number of feature amounts entered in the learning model is reduced, and the processing speed of the learning model can be thereby increased.

Among the plurality of preprocessing components $C_m$, the learning model applying system S sets up the preprocessing component $C_m$ used in the calculation of the selected feature amount so as to be used in the calculation of the feature amount entered in the trained learning model, thereby accurately setting a calculation of the required feature amount. Further, the unnecessary preprocessing component $C_m$ is set so as not to execute the processing, and it is thus possible to prevent unnecessary processing and reduce the processing load on the preprocessing server 30.

The learning model applying system S can also speed up the calculation of feature amounts by inputting data of the same format to each preprocessing component $C_m$. For example, if data of different format is entered in each preprocessing component $C_m$, the processing to process the data is required. In the learning model applying system S, such processing is not required, and thus the calculation of feature amounts can be accelerated.

Further, the learning model applying system S executes each of selecting the feature amounts, applying the learning models, and setting the feature amount calculations as background processing, and thus such processing can be executed without hindering the real-time processing. As a result, for example, it is possible to generate a learning model that matches the latest trend without stopping the fraud detection performed in the real-time processing, to thereby improve the accuracy of the real-time processing (accuracy of detecting fraud).

The learning model applying system S can prompt the administrator of the website to take measures by notifying the administrator of information on the selected feature amounts. For example, when the behavior of a malicious third party changes and the feature amount having a large impact on the learning model changes, such a change can be communicated to the administrator so as to prompt the administrator to take some measures, such as to change the content of the website or to change the design of the program executed by the service providing server 50.

5. Variations

The one or more embodiments of the present invention is not to be limited to the above described embodiment. The one or more embodiments of the present invention can be changed as appropriate without departing from the spirit of the one or more embodiments of the present invention.

Figure 10:
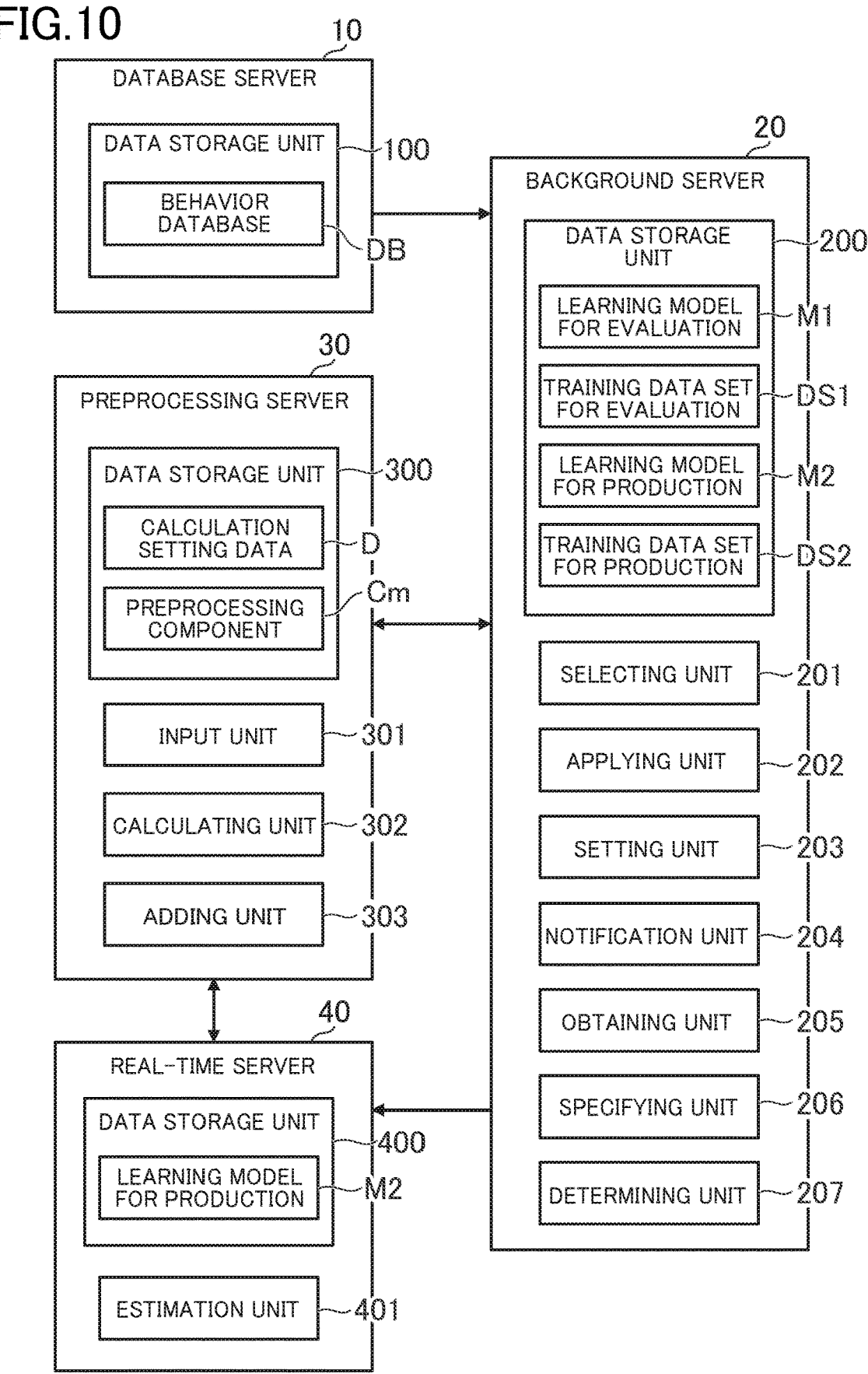
FIG. 10 is a functional block diagram in a variation.

FIG. 10 is a functional block diagram in a variation. As shown in FIG. 10, in the variation described below, an obtaining unit 205, a specifying unit 206, a determining unit 207 and an adding unit 303 are implemented in addition to the functions described in the embodiment.

(1) For example, when the behavior of the malicious third party changes, the existing feature amount may not be able to detect fraud with high accuracy. In this case, it is required to calculate a new feature amount that cannot be calculated by the existing preprocessing component $C_m$ so as to attend to the change in the behavior of the malicious third party. As such, a new preprocessing component for calculating a new feature amount may be added to the preprocessing server 30.

The preprocessing server 30 of the variation (1) includes the adding unit 303. The adding unit 303 is mainly implemented by the control unit 31. The adding unit 303 adds a new preprocessing component for calculating a new feature amount.

The new feature amount is a feature amount that cannot be calculated by the existing preprocessing component $C_m$. In other words, the new feature amount is a feature amount that is not included in the n types of feature amounts. The new preprocessing component is generated by a person in charge of fraud detection in the learning model applying system S and performs processing different from the existing preprocessing component $C_m$. The new preprocessing component may calculate the new feature amount itself, or may perform processing such as aggregation required to calculate the new feature amount.

For example, the adding unit 303 stores a new preprocessing component in the data storage unit 300. Further, for example, the adding unit 303 sets up the calculation setting data in order to calculate a new feature amount. The adding unit 303 stores a calculation method of the new feature amount in the calculation setting data. The calculation method of the new preprocessing component and the new feature amount may be uploaded from a terminal of the person in charge of fraud detection, for example. The new feature amount is not entered in the currently applied learning model M2 for production, and thus the selection flag is OFF.

When the setting by the adding unit 303 is completed, the new feature amount can be calculated using the new preprocessing component. The calculating unit 302 calculates the new feature amount based on the new preprocessing component. The calculation of a feature amount itself is as described in the embodiment. The calculating unit 302 calculates the new feature amount in the background processing. The new feature amount calculated by the calculating unit 302 may be of one type or a plurality of types. Assuming that the new feature amount is p types (p: natural number), n+p types of feature amounts are calculated in the background processing.

If the new feature amount is selected by the selecting unit 201, the setting unit 203 sets the new preprocessing component to be used in calculating a feature amount entered in the learning model M2 for production. The processing of the setting unit 203 itself is as described in the embodiment, and for example, when a new feature amount is selected by the selecting unit 201, the setting unit 203 may perform the setting by turning on the selection flag of the calculated setting data D.

According to the variation (1), when a new feature amount is selected, a new preprocessing component is set so as to be used in calculating a feature amount entered in the trained learning model, and the accuracy of the learning model can thereby be improved. For example, even though the behavior of the malicious third party changes and it becomes difficult to detect fraud using the existing feature amounts, if a preprocessing component is added to set calculation of a new feature amount, the impact is determined and selected in the background processing. This enables to easily generate a learning model corresponding to the change in the behavior.

(2) Further, for example, rapid processing is required in the real-time processing, and thus, if it takes time to calculate a feature amount, the real-time processing may be hindered. For this reason, a feature amount may be selected in view of not only the impact of the feature amount on the learning model, but also the time required for calculating the feature amount. For example, if there are a large number of feature amounts having the same impact, a feature amount having short calculation time may be preferentially selected.

The background server 20 of the variation (2) includes an obtaining unit 205. The obtaining unit 205 is mainly implemented by the control unit 21. The obtaining unit 205 obtains a calculation time of each feature amount. The calculation time of a feature amount is the time from the start to the end of the calculation of the feature amount. For example, the obtaining unit 205 causes the preprocessing server 30 to measure the calculation time of each feature amount, and obtains the measurement results from the preprocessing server 30.

The preprocessing server 30 measures the calculation time of each feature amount by executing the timing processing using a real-time clock, for example. For example, the preprocessing server 30 starts measuring time when behavior data is entered in the preprocessing component $C_m$.

For each feature amount, the preprocessing server 30 measures the time from the start of measuring time to the end of the calculation of the feature amount, and transmits the calculation time of each feature amount to the background server 20.

When the obtaining unit 205 obtains the calculation time of each feature amount, the selecting unit 201 selects at least one of the feature amounts based on an impact of each feature amount in the learning model and the calculation time of each feature amount. For example, the selecting unit 201 calculates scores obtained by comprehensively evaluating the impact and the calculation time in the learning model, and selects k types of feature amounts based on the scores of the respective feature amounts. The score may be calculated based on a predetermined calculation formula, and the greater the impact and the shorter the calculation time, the higher the score.

For example, the selecting unit 201 selects k types of feature amounts in descending order of scores. Further, for example, the selecting unit 201 may select all feature amounts having scores equal to or larger than a threshold value. In this case, the number of feature amounts having the score greater than or equal to the threshold value is a numerical value of k. Further, for example, the selecting unit 201 may select feature amounts having a top predetermined percentage of scores. In this case, the number of feature amounts having the score of the top predetermined percentage is a numerical value of k. The selection of feature amounts by the selecting unit 201 is not limited to the above examples. For example, the selecting unit 201 may acquire a predetermined number of feature amounts in descending order of the calculation time in a case where there are a certain number of feature amounts having the impact equal to or greater than a threshold value in the learning model.

According to the variation (2), the speed of the real-time processing can be increased by selecting at least one of the feature amounts based on an impact of each feature amount on the learning model and the calculation time of each feature amount. Further, it is also possible to reduce the processing load on the preprocessing server 30 in real-time processing.

(3) Further, for example, if content of the feature amounts is related to each other, the output result of the learning model may not be affected even if any of the feature amounts is missing. For example, if there are the feature amount of "whether the average distance from the access location is less than 1 km" and the feature amount of "whether the average distance from the access location is less than 5 km", these feature amounts are related to each other. Even if at first glance the impact of these two feature amounts appears to be significant, in practice it may suffice to select only one of the feature amounts that are related to each other. As such, the variation (3) selects only a part of feature amounts that are related to each other.

The background server 20 of the variation (3) includes the specifying unit 206. The specifying unit 206 is mainly implemented by the control unit 21. The specifying unit 206 specifies a combination of feature amounts that are related to each other among a plurality of feature amounts. The feature amounts that are related to each other means that the feature amounts show similar content. The feature amounts that are calculated using the same process component $C_m$ can be the feature amounts that are related to each other. For example, the specifying unit 206 acquires not only an impact of each feature amount but also impact of each combination of feature amounts, and determines whether there are feature amounts that are related to each other in the combinations having a relatively higher impact. For example, among the combinations having the relatively high impact, the specifying unit 206 calculates impacts on the outputs by treating any feature amount as a missing value, and specifies feature amounts having a small impact as a combination of feature amounts that are related to each other.

If there is a combination of feature amounts that are related to each other, the selecting unit 201 selects a part of the combination. Assuming that there are q types (q: a natural number equal to or greater than 2) of feature amounts that are related to each other, the selecting unit 201 may select less than q feature amounts among the q types of feature amounts. For example, the selecting unit 201 selects a feature amount having a relatively higher impact from the q types of feature amounts. For example, the selecting unit 201 may randomly select a feature amount from the q types of feature amounts.

According to the variation (3), a combination of feature amounts that are related to each other is specified from a plurality of feature amounts, and if there is a combination of feature amounts that are related to each other, a part of the combination is selected. This enables to reduce the feature amounts to be calculated and also the processing burden on the preprocessing server 30.

(4) For example, if the calculation time of a feature amount is too long, the real-time processing may be hindered. On the other hand, if the processing speed of the real-time processing is emphasized, the accuracy of the fraud detection may be lowered. In order to evaluate the trade-off between the accuracy of fraud detection and the processing speed, a feature amount that requires long calculation time may be treated as a missing value and evaluated for an impact on the learning model.

For example, in the real-time processing, if the processing of one preprocessing component $C_m$ takes a long time, it may be timed out so as not to perform fraud detection. However, in detecting fraud, sometimes it may be preferable to interrupt the processing of the preprocessing component $C_m$ that requires a long time and set a missing value. As such, in the present variation, the deterioration of the accuracy when the target feature amount is treated as a missing value is evaluated. That is, it is evaluated to what extent the accuracy is lowered when the fraud detection is performed by deeming only the target feature amount as the missing value.

The background server 20 of the variation (4) includes the obtaining unit 205 and the determining unit 207. The obtaining unit 205 is as described in the variation (2). The determining unit 207 is mainly implemented by the control unit 21. The determining unit 207 determines whether the calculation time of each feature amount is equal to or longer than predetermined time. The predetermined time may be any time that can be a threshold value, and may be, for example, about 0.5 seconds to several seconds, or about 10 seconds to 30 seconds. Assume that the numerical value of the predetermined time is previously stored in the data storage unit 200.

When there is a feature amount having the calculation time equal to or longer than the predetermined time, the selecting unit 201 treats such a feature amount as a missing value, and evaluates the impact on the learning model. For example, the selecting unit 201 determines that there is no feature amount having the calculation time equal to or longer than the predetermined time, and evaluates the accuracy of the learning model. The selecting unit 201 compares the accuracy in the case where such a feature amount exists with the accuracy in the case where such a feature amount does not exist, and, if the difference in the accuracy is less than a threshold value, does not select such a feature amount. On the other hand, if the difference in accuracy is equal to or larger than the threshold value, the selecting unit 201 selects such a feature amount.

For example, if information related to the conversion of the accuracy with respect to TP (True Positive), TN (True Negative), FP (False Positive), and FN (False Negative) is obtainable, the selecting unit 201 may calculate prediction accuracy per feature amount in the normal learning model and prediction accuracy per feature amount in the learning model with missing values, and may calculate prediction accuracy in a case where a target feature amount is entered based on the ratio of the time-out in the verification of the actual processing speed.

Further, for example, if information related to reduced accuracy with respect to error in prediction accuracy is obtainable, when parameters are assigned so that a target feature amounts is a missing value at predetermined intervals (e.g., a constant multiple of the standard deviation), the selecting unit 201 may verify an impact of the feature amount on the prediction target and calculate the maximum or average degree of the error in the case where the feature amount is a missing value, and calculate the prediction accuracy in the case where the target feature amount is entered based on the ratio of the time-out in the verification of the actual processing speed.

In the above examples, a plurality of feature amounts may be mutually dependent. For this reason, parameters may be assigned to combinations of feature amounts by Grid Search, for example. For example, a missing value is included in the target of Grid Search, and the reduced accuracy caused by the missing value is thereby correctly evaluated. In this regard, the time required for the learning process increases depending on the combinations, and thus the parameters may be appropriately determined based on the resources and the calculation time of the background server 20, for example.

According to the variation (4), if there is a feature amount having the calculation time equal to or longer than the predetermined time, the feature amount is treated as a missing value, and its impact on the learning model is evaluated. This serves to legitimately evaluate a feature amount having long calculation time that causes an issue in the real-time processing.

(5) Further, for example, the above variations may be combined.

For example, the formats of data entered in the preprocessing components $C_m$ may be different from each other. For example, a program or a calculation formula for calculating a feature amount may be provided for each feature amount instead of preparing the preprocessing component $C_m$. Further, for example, the case of detecting fraud of a user who accesses a website is described in the embodiment, although the learning model applying system S may be applied to the case in which a newly generated learning model is applied, and may be applied to other cases. For example, the learning model applying system S may be applied to a case other than the case in which fraud of a user is detected, and may be applied to a case in which learning models such as natural-language processing, machine translation, text conversion, and chat bots are used.

Further, for example, the learning model applying system S may be applied to a case of detecting fraud when a user purchases a product on the Internet. In this case, the service providing server 50 provides a website of an online shopping mall to the user. Assume that the user performs use registration to register settlement information such as a card number in the service providing server 50. The settlement information may include information such as a shop ID and a shop name of the shop where the product is purchased, a product ID, a product name, quantity, settlement amount of the product, and a card number. For example, when the user purchases a product, the service providing server 50 generates behavior data including information such as payment of the user. The learning model applying system S calculates n types of feature amounts based on the behavior data including the user's payment information, and selects k types of feature amounts having a large impact on the learning model. The learning model applying system S may train the learning model to learn the selected k types of feature amounts to apply the learning model.

For example, the case in which the behavior data is classified has been described, although data other than the user behavior may be classified. For example, the learning model applying system S may be used for a case where subjects captured in image data are classified. For example, the learning model applying system S may be used in a case where weather is classified based on temperatures and humidity indicated by weather data. For example, the learning model applying system S may be used for a screen for generating a summary of text data. As another example, the learning model applying system S may be applied to a case where data of any content is classified.

For example, the computer included in the learning model applying system S is not limited to the example shown in FIG. 1. The learning model applying system S may include at least one computer, and for example, the background processing and the real-time processing may be performed by the same computer. Similarly, the computer that calculates feature amount and the computer that creates the learning model may be the same. Further, for example, the functions described in FIGS. 3 and 10 may be implemented by any computer, and each function may be implemented by one computer, or the functions may be shared by any number of computers. For example, the data described in the embodiment and the variations may be stored by a computer other than the learning model applying system S.

The invention claimed is:

1. An applying system for determining fraudulent activity in a website comprising:
   a preprocessing server configured to calculate a plurality of feature amounts based on data used for training a first learning model and a plurality of preprocessing components;
      wherein the first learning model is a model for detecting fraud in the website;
   a background server configured to:
      determine an amount of impact of each of the plurality of feature amounts on the first learning model's determination of the fraudulent activity;
      select at least one of the plurality of feature amounts based on an amount of impact of each of the plurality of feature amounts on the first learning model's determination of the fraudulent activity;
      apply a trained second learning model that is trained based on the at least one selected feature amount, the trained second learning model being different from the first learning model;
         wherein a final number of the selected feature amount or amounts, are less than a total number of feature amounts;
   a database server configured to store a value in a memory, the value being related to a first calculation of a first feature amount to be entered in the trained second learning model based on the at least one selected feature amount;
   a real-time server configured to:
      estimate, when a user accesses the website, fraud of the user based on the trained second learning model;
      restrict the user's access to the website when the fraud of the user is estimated as fraudulent, and
      wherein the background server is further configured to, among the plurality of preprocessing components, set a preprocessing component which is used in calculation of the selected feature amount, to be used in the calculation of the first feature amount to be entered in the trained second learning model.

2. The applying system according to claim 1, wherein the preprocessing server is configured to input data in a same format in each of the plurality of preprocessing components, and
   each of the plurality of preprocessing components performs calculation processing based on data in a same format as data entered in other preprocessing components.

3. The applying system according to claim 1, wherein the preprocessing server is configured to:
   add a new preprocessing component for calculating a new feature amount,
   calculate the new feature amount based on the new preprocessing component, and
   the preprocessing server selects the new feature amount, the preprocessing server sets the new preprocessing component to be used in the calculation of the new feature amount to be entered in the trained second learning model.

4. The applying system according to claim 1, wherein the background server is configured to:
   obtain a calculation time of each feature amount, and
   select at least one of the plurality of feature amounts based on an impact of each feature amount on the first learning model and the calculation time of each feature amount.

5. The applying system according to claim 1, wherein the background server is configured to:
   specify a combination of feature amounts that are related to each other from the plurality of feature amounts, and
   when a combination of feature amounts that are related to each other exists, the background server selects a part of the combination.

6. The applying system according to claim 1, wherein the background server is configured to:
   obtain a calculation time of each feature amount;
   determine whether the calculation time of each feature amount is equal to or longer than a predetermined time, and
   when a feature amount having its calculation time equal to or longer than the predetermined time, the background server treats the feature amount as a missing value and evaluates an impact of the feature amount on the first learning model.

7. The applying system according to claim 1, wherein the real-time server is configured to:
   estimate, when a user accesses the website, fraud of the user based on the trained second learning model and a setting for the calculation of the plurality of feature amounts, and
   select, the applying, and the setting is performed as background processing that is different from processing of the estimating.

8. The applying system according to claim 1, wherein the background server is configured to notify an administrator of the website of information about a selected feature amount.

9. An applying method for determining fraudulent activity in a website comprising:

calculating, using a preprocessing server, a plurality of feature amounts based on data used for training a first learning model and a plurality of preprocessing components;

wherein the first learning model is a model for detecting fraud in the website;

a background server configured to:

determining, using the preprocessing server, an amount of impact of each of the plurality of feature amounts on the first learning model's determination of the fraudulent activity;

selecting, using the preprocessing server, at least one of the plurality of feature amounts based on an amount of an impact of each of the plurality of feature amounts on the first learning model's determination of the fraudulent activity;

wherein a final number of the selected feature amount or amounts, are less than a total number of feature amounts;

applying, using the preprocessing server, a trained second learning model that is trained based on the at least one selected feature amount, the trained second learning model being different from the first learning model;

storing, using a database server configured to store, a value in a memory, the value being related to a first calculation of a first feature amount to be entered in the trained second learning model based on the at least one selected feature amount;

estimating, using a real-time server when a user accesses the website, fraud of the user based on the trained second learning model;

restricting, using a real-time server, the user's access to the website when the fraud of the user is estimated as fraudulent, and wherein the background server is further configured to, among the plurality of preprocessing components, set a preprocessing component which is used in calculation of the selected feature amount, to be used in the calculation of the first feature amount to be entered in the trained second learning model.

10. The applying system according to claim 1, wherein the at least one processor sets a first, of the plurality of preprocessing components based on the value, which is not used in calculation of the selected at least one feature amount out of the plurality of feature amounts, not to be used in the calculation of the first feature amount to be entered in the trained second learning model.

11. The applying system according to claim 1, wherein the plurality of feature amounts indicate characteristics of behavior data indicating a behavior of a user on a website.

12. The applying system according to claim 11, wherein the system generates the behavior data based on the user's behavior on the website.

13. The applying system according to claim 1, wherein the at least one selected feature amounts have a relatively large impact, compared to other feature amounts, with respect the first learning model's determination of the fraudulent activity.

14. The applying system according to claim 1, wherein the plurality of feature amounts are at least two selected from the group consisting of: an average distance from the user's access location, an elapsed time from the user's previous access, a frequency of the user's access, a usage of a service by the user, an amount of payment by the user, and a frequency of payment by the user.

15. The applying system according to claim 1, wherein the amount of impact of each of the plurality of feature amounts is a numerical value.

16. The applying system according to claim 15, wherein the background server is configured to determine the amount of impact of each of the plurality of feature amounts on the first learning model's determination of the fraudulent activity using a Permutation Importance method.

17. The applying system according to claim 1, wherein the preprocessing server calculates the plurality of feature amounts.

18. The applying system according to claim 1, wherein the preprocessing server is configured to calculate the plurality of feature amounts using a plurality of calculation formulas for calculating a feature amount from a value output from the plurality of preprocessing components.

* * * * *